Sept. 26, 1933.  C. C. MINTER  1,928,299
INTERNAL COMBUSTION ENGINE
Filed Nov. 11, 1931
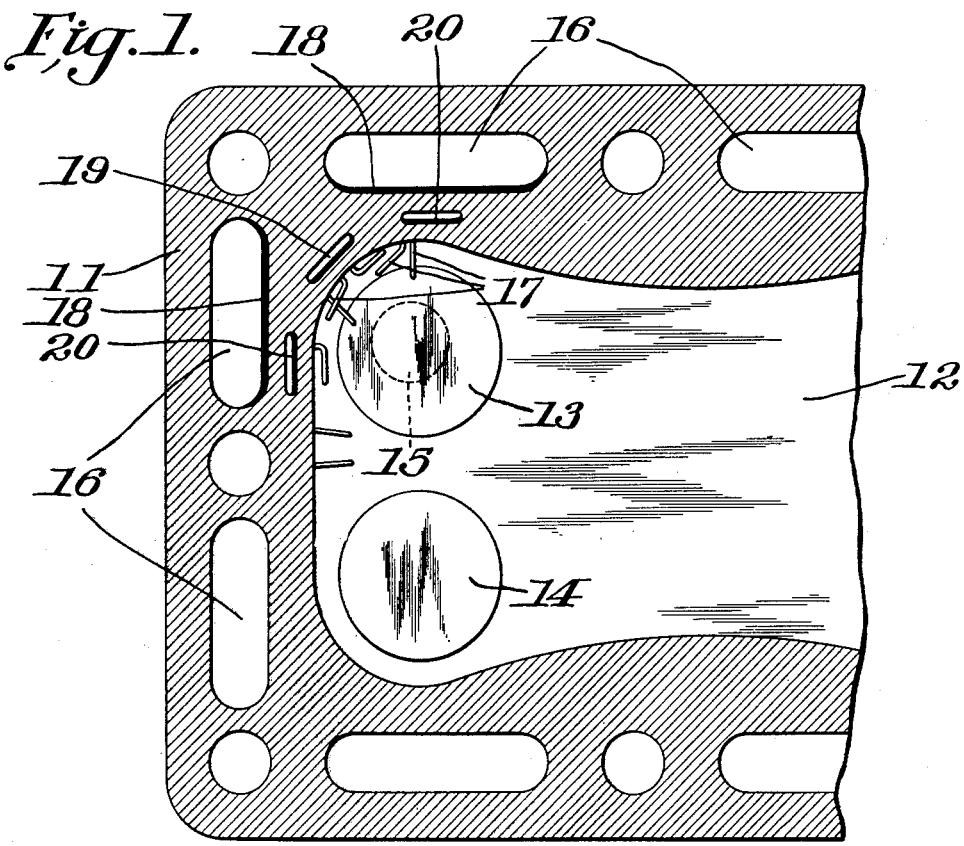
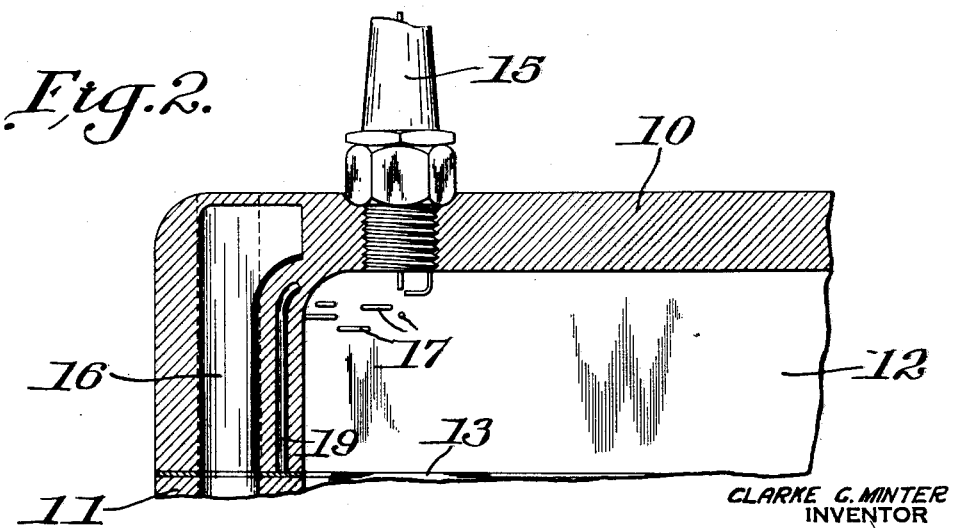
CLARKE C. MINTER
INVENTOR
BY R. J. Dearborn
HIS ATTORNEY Patented Sept. 26, 1933

1,928,299

UNITED STATES PATENT OFFICE 1,928,299

INTERNAL COMBUSTION ENGINE

Clarke C. Minter, Beacon, N. Y.

Application November 11, 1931
Serial No. 574,243

4 Claims. (Cl. 123—191)

My invention relates to internal combustion engines and more particularly to engines having means for accelerating the reactions which occur in the explosive charge upon the ignition thereof in the combustion chamber or chambers of such engines as are described in my Patent #1,741,032, dated December 24, 1929.

In that patent I described an internal combustion engine provided with extensions or contact means projecting from the cylinder head and from the opposite face of the piston for accelerating the reactions which occur in the gaseous phase in the charge upon compression and ignition thereof, and without increasing the normal heating effect of the compression stroke on the charge.

Generally speaking, the present invention contemplates and has for an object to provide means for improving the operation of internal combustion engines of the type described in my Patent #1,741,032.

The surface-contact means employed in internal combustion engines of this type may be in the form of metallic vanes, nodes, protuberances or wires, and they are preferably arranged in or on the walls of the combustion chamber in the region or vicinity of the spark plugs so as to form local hot spots and facilitate the burning of the portion of the charge first ignited. As these surface-contact means are located in the vicinity of the spark plugs they become excessively hot and the contained heat is quickly conveyed through them to the cylinder walls which normally are provided with a water jacket or ducts through which a cooling fluid is circulated. A large amount of heat thus passes from the combustion chamber and is absorbed and carried away by the fluid cooling medium.

I have found that the operation of engines of this type can be considerably improved by preventing the escape of too much heat from the combustion chamber in the immediate vicinity of the spark plug or plugs and accordingly, one of the objects of the present invention is to provide, in internal combustion engines of the type described, means for preventing or inhibiting the loss of excessive quantities of heat through the surface-contact means and cylinder walls, and, to accomplish this beneficial result the invention contemplates the placing of insulating media or means between the surface-contact means and the cooling fluid in the water jacket or ducts.

A further object of the invention is to provide means for retaining within the surface-contact means sufficient heat to promote efficient combustion in the combustion chamber.

These and other objects, features and advantages of the invention will more readily appear as the following description taken in connection with the accompanying drawing proceeds.

In the drawing, Figure 1 is a sectional plan view of a portion of a cylinder head of a single cylinder internal combustion engine of the L-head type, and Figure 2 is a view in vertical section of a portion of the same cylinder head.

In the drawing there is shown a portion of a cylinder head 10 of a single cylinder internal combustion engine of the L-head type. The head is adapted to be secured by bolts or otherwise to the upper end of a cylinder block 11 to form a combustion chamber 12. The chamber 12 is provided with suitable ports (not shown) to admit and carry away the combustible mixture and exhaust gases, and these ports are controlled by intake and exhaust valves 13 and 14, respectively, which function in a conventional manner and therefore need not be described. Spark plug 15 is mounted in the cylinder head 10 in the usual manner.

The walls of the cylinder head 10 and block 11 are provided with holes or ducts 16 for the circulation of a fluid cooling medium, preferably water, in the customary manner. Water circulating through these holes or ducts removes heat conveyed from the combustion chamber 12 through the walls thereof and minimizes the danger of overheating the engine.

As described in my Patent #1,741,032, surface-contact means in the form of metal pins or wires 17 are welded or otherwise secured to the cylinder head 10 in the vicinity of the spark plug 15. The arrangement and spacing of the surface-contact means or pins 17 may be varied according to requirements and in the drawing only a sufficient number of pins have been shown to illustrate the invention.

These pins accelerate the reactions which occur in the gaseous phase in the charge upon compression and ignition thereof, and very rapidly give up their heat to the larger masses of the walls of the combustion chamber 12 and head 10 to which they are attached and through which the fluid cooling medium is constantly circulating. In fact, I have found that under some operating conditions the loss of heat through the surface-contact means may be excessive and for that reason I have provided means for preventing or inhibiting the loss of excessive quantities of heat through the surface-contact means.

This result may be accomplished in any one of several ways. Under some circumstances it may be desirable to plug off certain of the holes or ducts 16 in the immediate vicinity of the spark plug 15 to prevent the circulation of the fluid cooling medium therethrough. Under other circumstances it may be desirable to line that portion of the walls of the ducts or holes nearest the spark plug with a layer of a suitable heat insulating material such, for example, as vitreous enamel as shown at 18. Either of the two foregoing methods would be possible with the existing type of cylinder block. However, the desired result can readily be accomplished by casting or drilling in the wall of the cylinder head 10 one or more auxiliary air spaces or chambers 19 between the holes or ducts 16 and the inner wall of the cylinder head, in the vicinity of the spark plug 15. These auxiliary air passages 19 serve to insulate the ducts 16 from the combustion chamber 12 and therefore prevent too rapid passage of heat through the walls to the fluid cooling medium in the ducts 16. If necessary, the walls of the auxiliary ducts could, of course, be lined with a suitable insulating material such as vitreous enamel as indicated at 20.

With the construction hereinbefore described, the combustion of the explosive mixture in the vicinity of the spark plug is accelerated, and at the same time the too rapid loss of heat from the combustion chamber 12 is prevented or checked, and consequently the most efficient operation of the engine is obtained. It should be understood that for the purpose of illustration I have shown a single cylinder engine only, but the invention is equally applicable to an engine having any number of cylinders.

A preferred embodiment of my invention has been illustrated and described for the purpose of showing one or more ways in which the invention may be practised, but the inventive idea upon which this application is based is broader than this illustrative embodiment thereof, and no limiations are therefore intended other than those imposed by the appended claims.

I claim:

1. In an internal combustion engine having a cylinder, a spark plug for igniting an explosive mixture in the cylinder, means for circulating a liquid cooling medium around the cylinder to absorb and carry away the heat of combustion from the cylinder, and means interposed between the cooling medium and the cylinder wall adjacent the spark plug for preventing too rapid passage of heat from the cylinder to the cooling medium.

2. In an internal combustion engine having a combustion chamber and a spark plug for effecting the combustion of the explosive mixture therein, means in the combustion chamber for accelerating the burning of the explosive mixture in the vicinity of the spark plug after ignition thereof, and means for retarding the passage of heat from the combustion chamber in the vicinity of the spark plug.

3. In an internal combustion engine having a combustion chamber and a spark plug for effecting the combustion of the explosive mixture therein, means in the combustion chamber for accelerating the burning of that part of the explosive mixture first ignited, and means for partially insulating that portion of the combustion chamber exposed to the heat of combustion of that part of the explosive mixture first ignited to cause it to retain sufficient heat for efficient operation.

4. The combination with an internal combustion engine having a combustion chamber, ducts in the wall surrounding said chamber for the circulation of a fluid cooling medium and a spark plug for effecting the combustion of the explosive mixture in said chamber, of insulating means interposed between the cooling fluid in said ducts and the combustion chamber in the vicinity of said spark plug to prevent too rapid passage of the heat of combustion from the combustion chamber to the cooling fluid.

CLARKE C. MINTER.